M. LEITCH.
BEARING FOR MACHINERY.
APPLICATION FILED FEB. 26, 1920.

1,425,664.

Patented Aug. 15, 1922.

WITNESS:
Rob't W. Kitchel.

INVENTOR.
Meredith Leitch
BY Frank S. Busser
ATTORNEY.

UNITED STATES PATENT OFFICE.

MEREDITH LEITCH, OF POUGHKEEPSIE, NEW YORK, ASSIGNOR TO THE DE LAVAL SEPARATOR COMPANY, OF NEW YORK, N. Y., A CORPORATION OF NEW JERSEY.

BEARING FOR MACHINERY.

1,425,664.  Specification of Letters Patent.  Patented Aug. 15, 1922.

Application filed February 26, 1920. Serial No. 361,610.

*To all whom it may concern:*

Be it known that I, MEREDITH LEITCH, a citizen of the United States, residing at Poughkeepsie, county of Dutchess, and State of New York, have invented a new and useful Improvement in Bearings for Machinery, of which the following is a full, clear, and exact description, reference being had to the accompanying drawings, which form a part of this specification.

My invention relates to renewable bearing liners for machinery. The object of my invention is to provide a light weight renewable liner with oil groove and so secured against turning with its shaft that it will tend to expand in its hole.

In the hand driven sizes of certain makes of centrifugal separators, all bearings in the frame, except those for the crank shaft, are provided with renewable bushings. If the bosses for these bearings are kept within reasonable sizes, there is room for only a very thin liner. My invention is intended primarily for these places but is applicable to many others. A liner, as thin as it is desirable to use, cannot be secured by set screws or similar clamping means. If the two edges are formed into hooks engaging a key way in the supporting hub, friction of the shaft in the liner will tend to cause it to hug the shaft and so increase the friction. Any oil groove cut in such a thin liner without cutting it in two would be so small as to be ineffective.

My invention is intended primarily for use in centrifugal machine bearings like those above specified, but is adapted for use in machine bearings generally and particularly in bearings for rapidly rotating shafts.

In the accompanying drawings, which show a preferred embodiment of my invention:

The hub $a$ has a bore $b$ larger than the shaft to be supported. Near the top of the bore are two ratchet notches $c$ and $d$. Through the top side of the hub is an oil hole $e$. The liner $f$ is made of thin metal circularly formed but so short as to leave, between the two ends, a gap which acts as an oil distributing groove $g$. Two corners of this liner are bent outward to form lugs $h$ and $i$ adapted, when the line is forced into the bore, to enter the notches $c$ and $d$.

Figure 1:
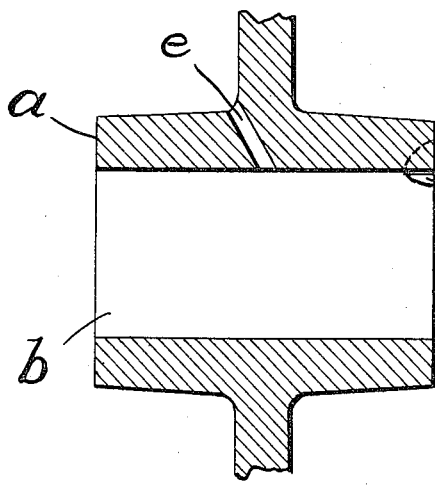
Fig. 1 is a longitudinal section of the bearing-supporting hub.
Figure 2:
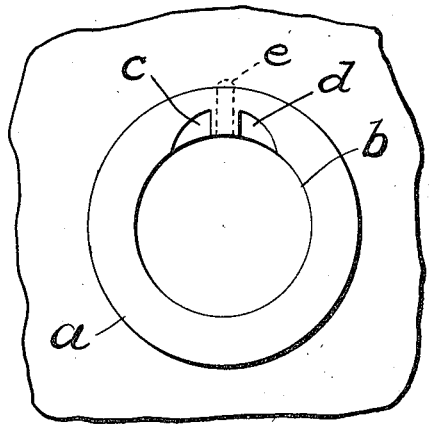
Fig. 2 is an end view of this hub.
Figure 3:
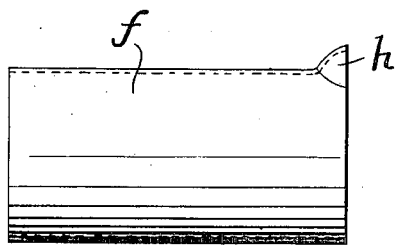
Fig. 3 is a side view, and Fig. 4 an end view, of one of the liners.
Figure 4:
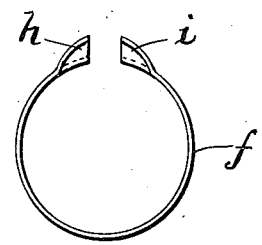
Figure 5:
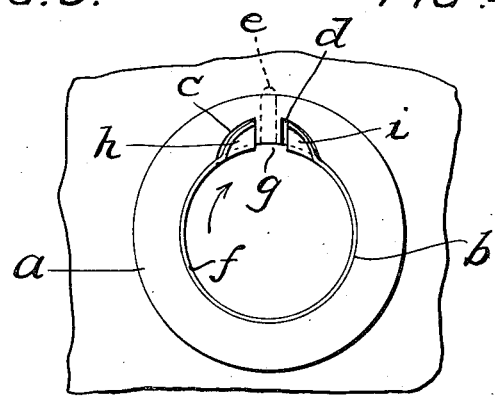
Fig. 5 is an end view of the hub with the liner in place.

When a shaft in the bearing is turned in the direction of the arrow in Fig. 5, the liner may turn with it until the lug $h$ strikes the end of the notch $c$. The shaft continuing to turn will tend to force the end adjacent to the lug $i$ farther away from the end adjacent to the lug $h$, thus expanding the liner in the bore. Rotation in the opposite direction will cause the lug $i$ to engage with the notch $d$ and friction of the shaft against the end adjacent to the lug $h$ will tend to cause expansion of the liner in the bore.

From the foregoing description, it will be seen that I have produced a renewable bearing liner of minimum thickness which will not turn with nor hug the shaft and which leaves an effective oil distributing groove.

Having now fully described my invention, what I claim and desire to protect by Letters Patent is:

1. In a shaft bearing, the combination with a bearing support and a shaft, the one being rotatable relative to the other, of an interposed expansible shaft-supporting liner, and means adapted in the rotation of the shaft in either direction to expand the liner in the support.

2. In a shaft bearing, the combination with a shaft and a bearing support, the one being arranged to be rotated relative to the other, of an interposed split shaft supporting liner, and coacting means on the liner and support to hold one end of the liner from turning with the shaft while permitting the other end of the liner to be moved away from the first end and, by frictional contact with the shaft, expand the liner in the support when the shaft is rotated in one direction and for holding the second end and permitting the first end to be moved when the shaft is rotated in the reverse direction.

3. In a shaft bearing, the combination with a bearing support and a shaft, the one being rotatable relative to the other, of an interposed shaft supporting liner split in a substantially longitudinal direction, and coacting means on the support and on the liner on opposite sides of, and adjacent, the space formed by the split adapted to arrest rotation of the liner with the shaft and in the rotation of the liner in either direction to expand the liner.

4. In a shaft bearing, the combination with a shaft and a bearing support, the one being rotatable relative to the other, of a shaft supporting liner split in a general direction of extension of the axis of the shaft and having a thickness to fit the space between the bore and the shaft and tending to be turned by the shaft in the latter's rotation, and liner rotation preventing means adapted, when said tendency is operative by reason of the rotation of the shaft in either direction, to cause enlargement of the circle of the liner.

5. In a shaft bearing, the combination with a shaft and a bearing support, of an interposed split shaft-supporting liner, and reversely disposed coacting stops on the ends of the liner and the support, each stop being arranged to restrain the liner against movement in one direction but permitting it to move in the reverse direction.

6. In a shaft bearing, the combination with a shaft and a bearing support bored larger than the shaft, the one being rotatable relative to the other, of a liner having a thickness to fit the space between the bore and the shaft and formed into an incomplete circle, and means opposing forward movement of the leading end of the liner and thereby preventing rotation of the liner with the shaft.

7. In a shaft bearing, the combination with a shaft and a bearing support bored larger than the shaft, the one being rotatable relative to the other, of a liner having a thickness to fit the space between the bore and the shaft and formed into an incomplete circle, means opposing forward movement of the leading end of the liner regardless of the direction of rotation of the shaft and thereby preventing rotation of the liner with the shaft, and means permitting a movement of the other end of the liner tending to expand the liner within the bearing support.

8. In a shaft bearing, the combination with a shaft and a bearing support bored larger than the shaft, the one being rotatable relative to the other, of a liner having a thickness to fit the space between the bore and the shaft and formed into an incomplete circle, means opposing forward movement of that end of the liner which, in its movement in either direction, is the leading end, thereby preventing rotation of the liner with the shaft, and means permitting a movement of that end of the liner which, in its movement in either direction, is the trailing end tending to expand the liner within its support.

9. In a shaft bearing, the combination with a shaft and a bearing support, the one being rotatable relative to the other, of a liner split in the general direction of extension of the axis of the shaft, an oil feed, and means to expand the liner in its support and hold the liner in position to register its break with the oil feed.

10. In a shaft bearing, the combination with a bearing support and a shaft, the one being rotatable relative to the other, of an interposed liner split in the general direction of extension of the axis of the shaft and having a capacity of limited circumferential movement and tending to so move in the rotation of the shaft in either direction, and means operative in the rotation of the shaft in either direction to arrest the movement of that edge of the liner adjacent the split which in such movement is the forward edge and tend to force the rear edge of the liner further away from the forward edge and thereby expand the liner in the bore.

11. In a shaft bearing, the combination with a shaft and a surrounding bearing support having two recesses, of an interposed liner split in the general direction of extension of the axis of the shaft and two stop projections on the liner adjacent opposite edges of said split and extending loosely into said respective recesses; that stop projection which in the movement of the shaft in either direction is the forward stop projection being arrested by its engagement with the wall of its corresponding recess while the rear stop projection tends to recede from the forward stop projection, thereby expanding the liner in its support.

12. In a shaft bearing, the combination with a rotatable shaft and a fixed bearing support provided with an oil feed, of an expansible liner comprising a wide, thin, broken ring adapted to embrace the shaft, and coacting means on the liner and support adapted to register the break in the liner with oil feed and allow expansion of the liner while thus positioned.

13. In a shaft bearing, the combination with a bearing support bored having cut therein two oppositely acting ratchet notches, of a liner bent into an incomplete circle and having portions bent so as to be adapted to engage the ratchet notches, thereby preventing rotation of the liner.

14. In a shaft bearing, the combination with a hub bored larger than the shaft and having two notches, of a liner comprising a piece of metal having a thickness slightly less than the difference in radii of the shaft and bore, a width equal to the desired length of bearing and a length less than the circumference of the bore, circularly formed to fit the inside of the bore and having two corners outwardly bent to fit the two notches.

In testimony of which invention, I have hereunto set my hand, at Poughkeepsie, N. Y., on this 20 day of February, 1920.

MEREDITH LEITCH.